United States Patent [19]
Yoshikawa et al.

[11] Patent Number: 6,034,834
[45] Date of Patent: Mar. 7, 2000

[54] HEAD DRIVING DEVICE AND METHOD FOR DRIVING THE SAME FOR REDUCING ERROR DUE TO ACTUATOR STRUCTURE VIBRATION

[75] Inventors: Norio Yoshikawa, Yokohama; Shigeru Takekado, Tokyo; Takehito Yamada, Tokuyama, all of Japan

[73] Assignee: Kabushiki Kaisha Toshiba, Kawasaki, Japan

[21] Appl. No.: 08/713,847

[22] Filed: Sep. 12, 1996

[30] Foreign Application Priority Data

Sep. 12, 1995 [JP] Japan .................................. 7-234513

[51] Int. Cl.⁷ .................................................. G11B 21/10
[52] U.S. Cl. .......................................... 360/75; 360/78.05
[58] Field of Search .............................. 360/78.12, 78.05, 360/109, 106, 75

[56] References Cited

U.S. PATENT DOCUMENTS

| | | | |
|---|---|---|---|
| 3,924,268 | 12/1975 | McIntosh et al. | 360/78.05 |
| 4,858,040 | 8/1989 | Hazebrouck | 360/78.05 |
| 4,967,293 | 10/1990 | Aruga et al. | 360/78.12 |
| 4,969,058 | 11/1990 | Williams et al. | 360/78.12 X |
| 5,062,012 | 10/1991 | Maeda et al. | 360/78.12 X |
| 5,177,652 | 1/1993 | Yamaguchi et al. | 360/78.05 |
| 5,189,578 | 2/1993 | Mori et al. | 360/78.05 X |

FOREIGN PATENT DOCUMENTS

| | | | |
|---|---|---|---|
| 0549814A1 | 7/1993 | European Pat. Off. | 360/78.05 |
| 51-36924 | 3/1976 | Japan . | |
| 2-226560 | 9/1990 | Japan | 360/78.05 |
| 3-69072 | 3/1991 | Japan . | |
| 3-102684 | 4/1991 | Japan . | |
| 3-183070 | 8/1991 | Japan . | |

OTHER PUBLICATIONS

The Institute of Electronics, Information and Communication Engineers, vol., J75, No. 11, pp. 653–662, 1992, Haruaki Otsuki, et al., "Track Following Control of 2–Stage Access Servo System for Magnetic Disk Drives".

*Primary Examiner*—Aristotelis M. Psitos
*Assistant Examiner*—James L. Habermehl
*Attorney, Agent, or Firm*—Oblon, Spivak, McClelland, Maier & Neustadt, P.C.

[57] ABSTRACT

A head driving device of a disk recording/reproducing device, which has a plurality of heads mounted thereon to record/reproduce data in and from a disk for positioning the plurality of heads in target positions by moving these in a radial direction of the disk, comprises a plurality of suspension members for respectively supporting the plurality of heads, a head arm member having a plurality of support arms for supporting the plurality of suspension members for transmitting rotary driving forces for moving the plurality of heads, main driving section for moving the plurality of heads by rotary-driving the head arm member, and sub-driving section for integrally driving the plurality of support arms in a fine manner and fine-adjusting movements of the plurality of heads moved by the main driving section.

14 Claims, 13 Drawing Sheets

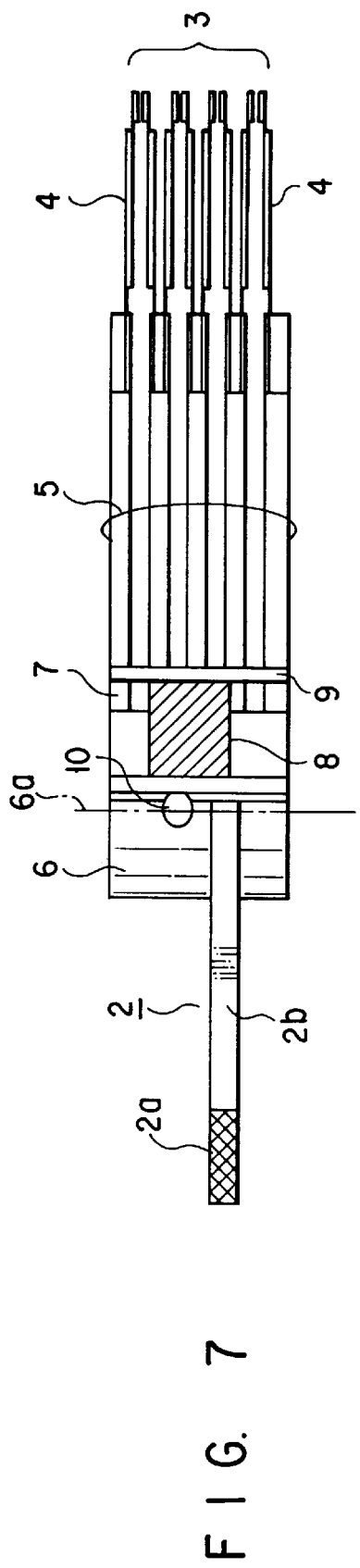
F I G. 7
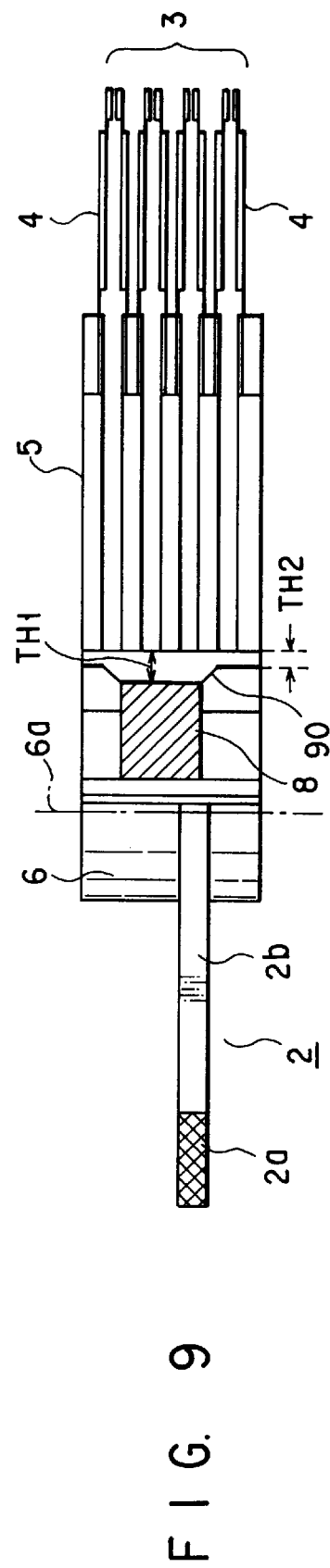
F I G. 9
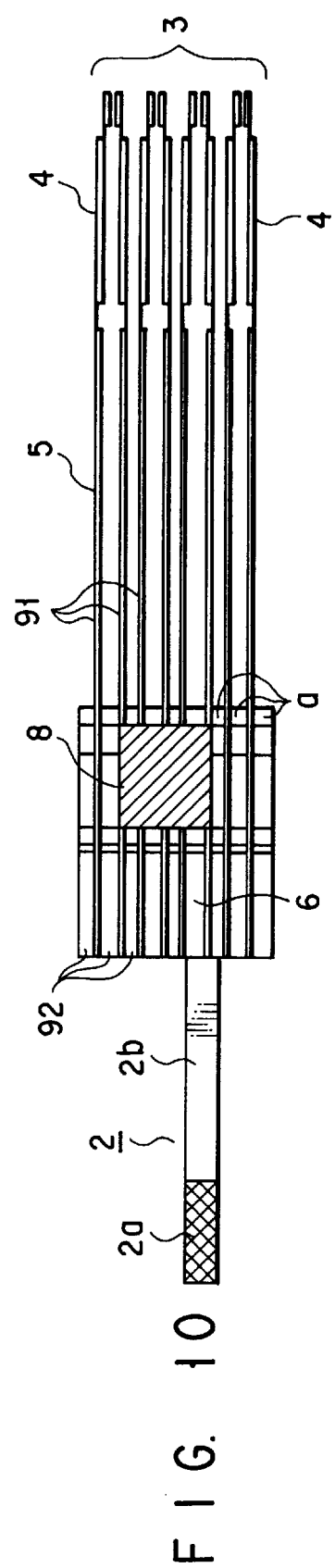
F I G. 10

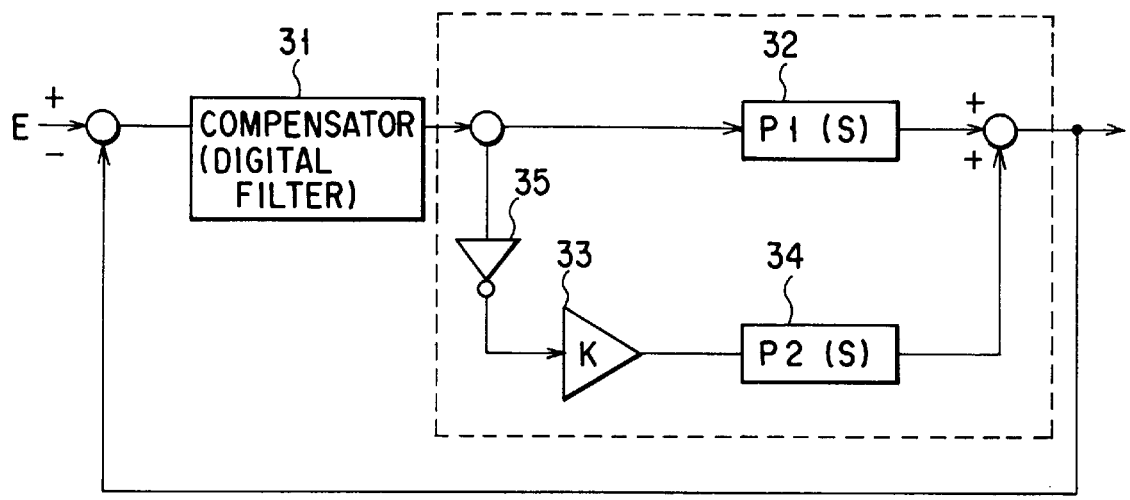
F I G. 13
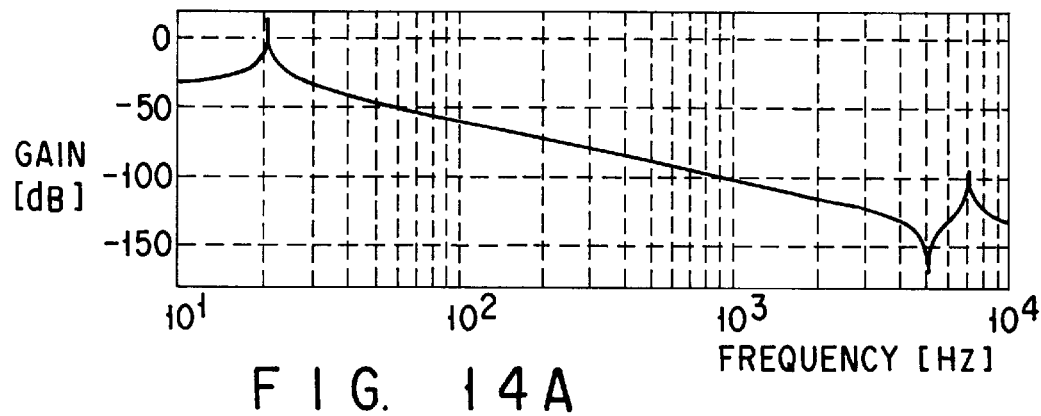
F I G. 14A
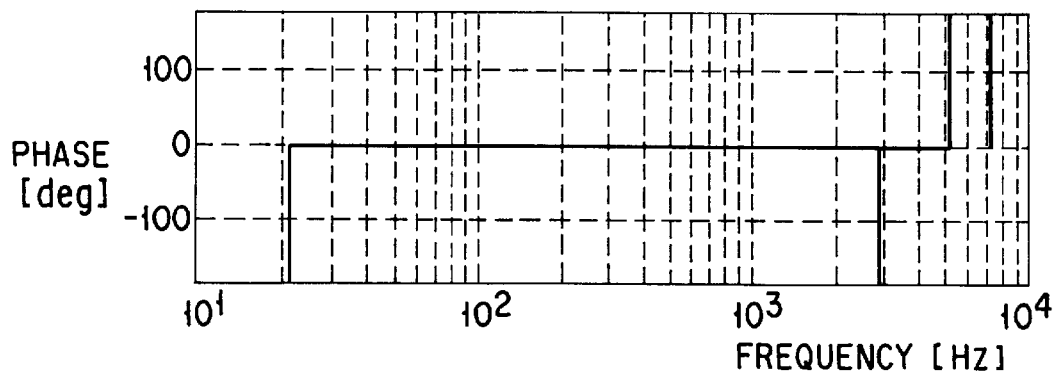
F I G. 14B

HEAD DRIVING DEVICE AND METHOD FOR DRIVING THE SAME FOR REDUCING ERROR DUE TO ACTUATOR STRUCTURE VIBRATION

BACKGROUND OF THE INVENTION

1. Field of the Invention

The present invention relates to a head driving device for moving a head for recording/reproducing data in the radial direction of a disk and placing this in a target position and a method for driving the same in a disk recording/reproducing device, for instance a hard disk drive.

2. Description of the Related Art

Conventionally, especially a compact hard disk drive (HDD) has been utilized as a built-in type external storage device for the personal computer of a laptop type or a notebook type. In recent years, with attainment of high performance for the personal computer, there has been an increase in demands for compact and large storage capacity HDDs.

In order to increase the storage capacity of the HDD, it is necessary to improve the track density and linear recording density of a disk as a recording medium so as to attain the high recording density of the disk. With the attainment of such a high recording density, a technology must be provided, whereby a head may be highly accurately positioned in a target position (track) to be accessed on the disk.

In the HDD, head positioning control is executed by means of a servo system for typically performing speed control and position control. The servo system positions the head in the target position by drive-controlling a head actuator for supporting the head and moving this in the radial direction of the disk.

Accordingly, in order to effectuate highly accurate positioning control for the head, various ideas have been tried to improve the mechanism of the head actuator in addition to a control technique.

As shown in FIG. 1, the conventional compact HDD incorporates a rotary and oscillatory type head actuator 1 constituting a disk drive, a disk 101, a spindle motor 102, a voice coil motor (VCM) 2 and a circuit substrate 103 in a case 100 made of, for instance an aluminum alloy.

The disk 101 rotates at a high speed, being driven by the spindle motor 102. The circuit substrate 103 is provided with various circuit parts, for instance a head amplifier for amplifying a read signal from a head 3.

The head actuator 1 is constructed by a suspension 4 for supporting the head 3, a support arm (head arm) 5 for supporting the suspension 4 and transmitting a rotary driving force and an actuator body 6 supporting the support arm 5 and driven to rotate around a rotary shaft 6a by means of a driving force provided by the VCM 2.

A plurality of disks 101 are normally provided in the HDD and heads 3 are disposed in both surfaces of each disk 101. Accordingly, a suspension 4 is provided for each head 3. Support arms 5 are provided according to the number of heads 3 so as to be smaller in number than the latter.

The head 3 is mounted in a slider. By means of the floating movement of this slider, a reading/writing operation is performed with a constant tiny gap from the surface of the disk 101.

The VCM 2 is constructed by a driving coil provided in a coil frame having an almost V-shaped structure, not shown, a permanent magnet and opposing yokes. The permanent magnet and the opposing yokes constituting a magnetic circuit are disposed in upper and lower directions so as to sandwich the driving coil held on the coil frame of the support arm 5. The permanent magnet is supported by a holding yoke.

The VCM 2 conducts electricity to the driving coil placed within a magnetic field produced between the driving coil and the opposing yokes and an electro-magnetic force produced in the driving coil causes the support arm 5 of the actuator to rotate and oscillate around the rotary shaft 6a. A rotary and oscillatory ball bearing is provided in the actuator body 6.

The servo system controls the driving current of the VCM 2 so as to execute drive-controlling of the head actuator based on servo data recorded beforehand in the servo area of the disk 101.

As a cause of failure when by highly accurately driving the head actuator, the head 3 is to be positioned in the target position with high accuracy, mechanical vibrations occurring in components, for instance the support arm 5, constituting the head actuator may be cited.

When the servo system supplies a current to the driving coil of the VCM 2 and drives the head actuator in the radial direction of the disk, a transmission characteristic on a frequency with the position error signal (burst data) of the servo data (displacing response to a force and called compliance) will be like that shown in FIGS. 2A and 2B.

The position error signal is servo data used for the above-noted position control operation and detecting the position error of the head 3 from the center of the track.

In this case, a gain peak due to resonance is reached largely because of the rolling friction characteristic of the ball bearing provided in the actuator body 6 in the vicinity of 100 Hz and the main resonance mode of the actuator structure itself in the vicinity of 4 kHz. FIGS. 3A to 3C are views respectively showing a modified main resonance mode in the vicinity of the frequency 4 kHz of the transmission characteristic shown in FIGS. 2A and 2B. This is an analytic model obtained by using a computer.

This analytic model enables us to assume that the main resonance mode of the actuator structure itself will be produced by a mode for moving the driving coil of the VCM 2 and the coil frame holding the same in the rotational direction of the disk 101.

Vibrations generated due to the actuator structure in such a high frequency of 1 kHz or higher may adversely affect the servo system for performing position control for the head 3, causing an erroneous operation, for instance off-track.

In other words, vibrations due to the actuator structure may cause reduction in accuracy for positioning the head 3 and the recording density of, especially a track direction (track density). Thus, in order to reduce adverse influence on the servo system as much as possible, in the head driving device, as many mechanical vibrations as possible due to unnecessary structures must be eliminated while the resonance vibrations of the support arm 5 and the like must be increased.

In order to increase the track density, it is desired to make track pitches as small as possible. It is necessary to increase the track follow-up ability of the head 3 (positioning characteristic with respect to the track center) so as to increase reliability of data recording/reproducing (reduction in the occurrence possibility of reading errors). Usually, track errors (assuming that an off-track amount is about three times as standard deviation) must be set to a level of 0.07 times with respect to the track pitch.

Furthermore, it is necessary to reduce vibrations from the outside of the HDD and off-track against an external force from the spindle motor 102 as much as possible. For this purpose, a gain cross frequency (frequency when the gain crosses 0 dB) in the open loop characteristic of the servo system must be increased as much as possible.

As a method for increasing such a gain cross frequency in the open loop characteristic of the servo system, reference may be made to, for instance Japanese Patent Application KOKAI Publication No. 51-36924 or "Track Following Control of 2-Stage Access Servo System for Magnetic Disk Drive", Electronics Information and Communication Society Thesis Magazine (Vol. J75, No. 11, p 653 to 662).

In the Publication and the Reference, there was presented a method of providing, in addition to a main actuator mechanism (driven by the VCM 2) for integrally (simultaneously) moving a plurality of heads by long strokes, an sub-actuator (constituted of a piezoelectric element) for fine-moving each head independently.

This method is also described in U.S. Pat. No. 3,924,268. According to the method of this Publication, the head is caused to follow-up narrow track pitches by a dual servo system such that the main actuator in the heavy mass section can move and the light sub-actuator can move in a high frequency band.

A method having a subactuator mounted for each support arm for supporting the head is described in Japanese Patent Application KOKAI Publications Nos. 51-36924, 3-69072, 3-102684 and 3-183070. According to this method, each head can individually move by the subactuator.

In the Japanese Patent Application KOKAI Publications Nos. 3-69072, 3-102684 and 3-183070, a reference is made to the case of a servo face servo system, wherein the subactuator is used as means for correcting heat off-track.

Heat off-track occurs because of deformation of each of a plurality of support arms in the radial direction of the disk due to a temperature increase inside and outside the device. For this reason, means for correcting the data head only by DC components based on the positional information of the servo face and the slight sector information for each data surface is utilized. This makes it necessary to dispose the subactuator for each support arm and to control each subactuator.

FIG. 4 is a view showing the concept of representing an actuator mechanism comprising the main actuator and the sub-actuator as a spring and material point system simple model (vibration model) in each actuator section.

This model assumes that the driving coil 111 of the VCM 2 has a mass m1, an electromagnetic force F1 acts on this material point and the coil is coupled with the rotary center 113 of the actuator and caused to rotate and move by means of the spring K1 of the coil frame. In the rotary center 113, a spring Ka due to a rolling frictional force by the ball bearing and the moment J of polar inertia of the actuator are provided. A piezoelectric element model 114 equivalent to the sub-actuator is provided in the tip of an arm length L2 from the rotary center 113 of the actuator.

A translation force F2 is applied to both ends of this section, with the piezoelectric element 114 acting in a tensile (or compressing) direction. A model 116 for the support arm section and the suspension section is provided in a side opposite the rotary center 113.

This model 116 is represented by a mass m3 and a spring k3, assuming that the support arm and the suspension constitute a single unit.

In the drawing, c1 and c2 represent viscosity attenuation, x1 the displacement of the driving coil 111 in the translation direction, x2 the displacement of the piezoelectric element model 114, x3 the displacement of the head point and θ the rotary angle displacement of the actuator around the rotary center 113.

A rod must be rigid with no mass. x4 represents "x4=−L1θ", x5 "x5=L2θ" and x6 "x6=x2+L3θ".

In such a vibration model, the following relational expressions (Expressions 1 to 4) hold true.

$$[M]\{\ddot{X}\} + [C]\{\dot{X}\} + [K]\{X\} = \{F\} \quad (1)$$

$$\{X\} = \begin{bmatrix} x1 \\ x2 \\ x3 \\ x4 \end{bmatrix}$$

$$[F] = \begin{bmatrix} F1 \\ F2 \\ 0 \\ -F2L2 \end{bmatrix}$$

$$[M] = \begin{bmatrix} m1 & 0 & 0 & 0 \\ 0 & m2 & 0 & 0 \\ 0 & 0 & m3 & 0 \\ 0 & 0 & 0 & J \end{bmatrix}$$

$$[C] = \begin{bmatrix} c1 & 0 & 0 & c1L1 \\ 0 & (c2+c3) & -c3 & (c3L3-c2L2) \\ 0 & -c3 & c3 & -c3L3 \\ c1L1 & (c3l3-c2L2) & -c3L3 & CA \end{bmatrix}$$

where, $CA = ca + c1L1^2 + c2L2^2 + c3L3^2$ $$[K] = \begin{bmatrix} k1 & 0 & 0 & k1L1 \\ 0 & (k2+k3) & -k3 & (k3L3-k2L2) \\ 0 & -k3 & k3 & -k3L3 \\ k1L1 & (k3l3-k2L2) & -k3L3 & KA \end{bmatrix}$$

where, $KA=ka+k1L1^2+k2L2^2+k3L3^2$ $\omega_1^2=k1/m1$, $\omega_2^2=k2/m2$, $\omega_3^2=k3/m3$, $\omega_a^2=ka/J$ $\omega_{a1}^2=k1L1^2/J$, $\omega_{a2}^2=k2L2^2/J$, $\omega_{a3}^2=k3L3^2/J$ If a response {X} is to be obtained by Laplace-transforming the above expression, the result will be as follows (S in the expression represents a Laplace operator):

$$\{X\}=[[M]S^2+[C]S+[K]]^{-1}\{F\} \quad (2)$$

If 0-order approximation is to be realized by assuming that viscosity attenuation items are all 0 and if attention is to be paid to the response displacement of the head x3 when the electromagnetic force F1 acts on the driving coil 111 of the main actuator and when the electromagnetic force F2 acts on the piezoelectric element 114 of the sub-actuator, the expression is as follows. In the expression, det represents a characteristic value. Head responses x3 (S) by the main actuator are as follows respectively.

$$x3(S) = \frac{-1}{det} \cdot \frac{L1L2}{J} \omega_1^2 \omega_2^2 \omega_3^2 \left\{ \frac{L2L3}{L3} + \frac{S^2}{\omega_2^2} \right\} F1(S) \quad (3)$$

$$P1(S) = \frac{x3(S)}{F1(S)}$$

-continued $$x3(S) = \frac{1}{det} \cdot \frac{\omega_3^2}{m2}\left\{\left(\omega_a^2\omega_1^2\right) + \left(\omega_a^2 + \omega_{aJ}^2 + \omega_1^2\left(1 - \frac{m2L2L3}{J}\right)\right)S^2 + \left(1 - \frac{m2L2L3}{J}\right)S^4\right\}F2(S) \quad (4)$$

Herein, parameters for the model are set as follows from the actual actuator mechanism:
m1=2.5×10⁻³ (kg), $\omega_1$=25133 (rad/sec)
m2=0.01×10⁻³ (kg), $\omega_2$=125664 (rad/sec)
m3=0.5×10⁻³ (kg), $\omega_3$=753982 (rad/sec)
J=0.5×10⁻⁶ (kgm²), $\omega_a$=251 (rad/sec)
L1=15×10⁻³ (m), L2=5×10⁻³ (m),
L3=40×10⁻³ (m)

By using these parameters, according to the expression (3), the transmission characteristics of head response displacement by the main actuator will be gain and phase characteristics like those shown in FIGS. 5A and 5B. Also, according to the expression (4), the transmission characteristics of head response displacement by the sub-actuator will be gain and phase characteristics like those shown in FIGS. 5C and 5D.

In FIGS. 5A to 5D, since there is no damping due to viscosity attenuation, gains by resonance will be high. However, there will be almost no change in frequencies having peaks in the gains, depending on the existence of damping.

The transmission characteristics of FIGS. 5A and 5B have tendencies similar to those shown in FIGS. 2A and 2B and spring resonance occurs due to the rolling friction of the ball bearing in the vicinity of a frequency below 100 Hz. When this resonance frequency is exceeded, the gains will be reduced at −40 dB/dec. At about 3 kHz, the gains will reach their peaks in the mode of the mechanical main resonance of the whole actuator structure. This resonance mode can be assumed to occur because of m1 and K1 of the driving coil 111.

FIGS. 5C and 5D respectively illustrate compliance by the sub-actuator. Gains will be almost flat until the mechanical main resonance mode of the whole actuator structure at 3 kHz. It can be understood, however, that the mechanical main resonance mode of the whole actuator structure is excited by driving the sub-actuator. This may be assumed to occur because of connection between the main actuator and the sub-actuator by means of a serial spring.

It is clear from the above description that when the sub-actuator is to be utilized, it is necessary to increase the mechanical main resonance mode of the entire actuator structure. In other words, in order to keep the gains flat up to the region of the high frequency band by the sub-actuator, it is necessary to provide a component as a notch filter in the servo system with respect to this resonance vibration number.

In recent years, digital servo system using a high-speed microprocessor has been developed for the compact HDD. This has made it easier to mount the notch filter. However, frequencies in the mechanical main resonance mode of the entire actuator structure vary among the devices and may change with the passage of time (secular change). This makes it extremely difficult to set the notch frequency of the notch filter (frequency not be passed through the filter). As a result, since positioning error amounts vary among the devices and increase during use, there is a possibility that it will be impossible to perform data recording/reproducing.

As described above, in the conventional head driving device equipped with the main actuator and the sub-actuator, the sub-actuator (piezoelectric element) is provided for each support arm. In such a structure, the number of piezoelectric elements provided to be driving means as the sub-actuators must be equivalent to that of support arms. Thus, in case where characteristics vary among the piezoelectric elements, head fine-movements and head (slider) floating characteristics may probably occur.

Cables and driving circuits for driving the sub-actuators must also be provided in the same number as that of support arms. This may complicate controlling of the individual sub-actuators by a control method.

Furthermore, since the sub-actuator is driven for each support arm, it is impossible to induce the main resonance mode of the entire actuator structure so as to increase a servo band in the head positioning system.

SUMMARY OF THE INVENTION

It is an object of the invention to highly accurately perform a head positioning operation by eliminating adverse influence due to variance in characteristics among sub-actuators and complication of a control method and stably position-controlling the head up to a high frequency band in a head driving device (method) equipped with main and sub-actuators.

In accordance with a first aspect of the invention, in a head driving device having a main actuator driven by main driving means, for instance a VCM, and sub-actuators as sub-driving means, for instance piezoelectric elements, a mechanism is provided, wherein the sub-driving means are disposed almost in the centrobaric position of the mechanism and support arms are integrally fine-driven so as to adjust fine-movement of each head.

More particularly, a head driving device of a disk recording/reproducing device according to the present invention, which has a plurality of heads mounted thereon to record/reproduce data in and from a disk for positioning the plurality of heads in target positions by moving these in a radial direction of the disk, comprises: a plurality of suspension members for respectively supporting the plurality of heads; a head arm member having a plurality of support arms for supporting the plurality of suspension members for transmitting rotary driving forces for moving the plurality of heads; main driving means for moving the plurality of heads by rotary-driving the head arm member; and sub-driving means for integrally driving the plurality of support arms in a fine manner and fine-adjusting movements of the plurality of heads moved by the main driving means. The head driving device further comprises a hinge for causing the head arm member to finely rotate by means of a fine driving force provided by the sub-driving means.

In the above-noted structures, the preferred manners are as follows.

(1) The sub-driving means is disposed almost in a centrobaric position of the head driving device.

(2) A control means for controlling driving of the main and the sub-driving means, adjusting a response gain for each input and canceling a resonance mode vibrating in the radial direction of the disk is further composed.

(3) The sub-driving means includes at least one piezoelectric element.

That is, at lease one sub-driving means (sub-actuator) is provided, which integrally fine-drives the plurality of support arms for supporting the plurality of heads via the respective suspensions.

In such a structure, it is possible to greatly limit the occurrence of variance in driving characteristics among the support arms such that the plurality of support arms can be integrally fine-driven by at least one sub-actuator. It is also possible to reduce the number of parts for cables and driving circuits necessary for driving the sub-actuator and simplify the control method.

Therefore, according to the first aspect of the invention, in the head driving device having the main and sub-actuators, the support arms can be integrally and uniformly fine-moved. Further, adverse effects due to variance in characteristics among the sub-actuators and complication of the control method can be eliminated. As a result, it is possible to execute the highly accurate head positioning operation.

In accordance with a second aspect of the invention, a driving control method is provided for main and sub-actuators, wherein by adjusting a response gain for each input, the mechanical main resonance mode of the entire actuator mechanism structure is eliminated and the head is stably position-controlled up to a high frequency band.

More particularly, Another head driving device comprises: a plurality of suspension members for respectively supporting a plurality of heads; a head arm member having a plurality of support arms for supporting the plurality of suspension members for transmitting rotary-driving forces for moving the plurality of heads; main driving means for moving the plurality of heads by rotary-driving the head arm member; sub-driving means for fine-driving each of the support arms and fine-adjusting movement of each head moved by the main driving means; and control means for controlling driving of the main and sub-driving means, adjusting a response gain for each input and canceling a resonance mode vibrating in a radial direction of a disk.

With above configuration, the control means includes means for controlling driving of the main and sub-driving means based on respective position error signals of the plurality of heads and inputting the position error signals to the main and sub-driving means with phases of these signals reversed among one another in a given low frequency region.

A head driving method in a head driving device described above comprises: a first step for setting an initial value; a second step for inputting a specified sine wave signal to the sub-driving means; a third step for obtaining a dispersion value of a position error signal obtained in the second step; and a fourth step for repeating processing from the second step to the third step until the position error signal reaches a prescribed value or lower.

Using such a driving control method, it is possible to eliminate the mechanical main resonance mode occurring in the driving coil side of the main actuator by means of driving of the sub-actuator. That is, if it is assumed that the main actuator and the sub-actuators are structurally composed of serial springs, by erasing the mechanical main resonance mode, the open loop characteristic of the head positioning control system of the main actuator can be flat up to a high frequency band on the line of −40 dB/dec. This is because the numbers of mechanical main resonance vibrations are the same between the main actuator and the sub-actuator, since these are composed of the serial springs. Accordingly, even when there exists variance in mechanical main resonance vibration numbers among the devices, it is possible, by making unnecessary adjustment, for instance by the notch filter, to simplify calculation by the control system and the circuitry.

As described above, according to the second aspect of the invention, the mechanical main resonance mode occurring in the driving coil side of the main actuator can be erased by means of driving of the sub-actuator. This makes it possible to eliminate the mechanical main resonance mode in the open loop characteristic of the head positioning characteristic from the main actuator and cause the same to be flat up to a high frequency band. As a result, since the good positioning servo system can be provided up to a high frequency band, it is possible to perform the highly accurate head positioning operation.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a side view showing the main sections of the head driving device of the first embodiment;

FIG. 9 is a side view showing a first modification of the first embodiment;

FIG. 10 is a side view showing a second modification of the first embodiment;

FIG. 13 is a block diagram of a control system of a driving control method of a fourth embodiment;

FIGS. 14A and 14B are views showing transmission characteristics of the fourth embodiment;

DETAILED DESCRIPTION OF THE PREFERRED EMBODIMENTS

The preferred modes of the invention will now be described by referring to the accompanying drawings.

Figure 6:
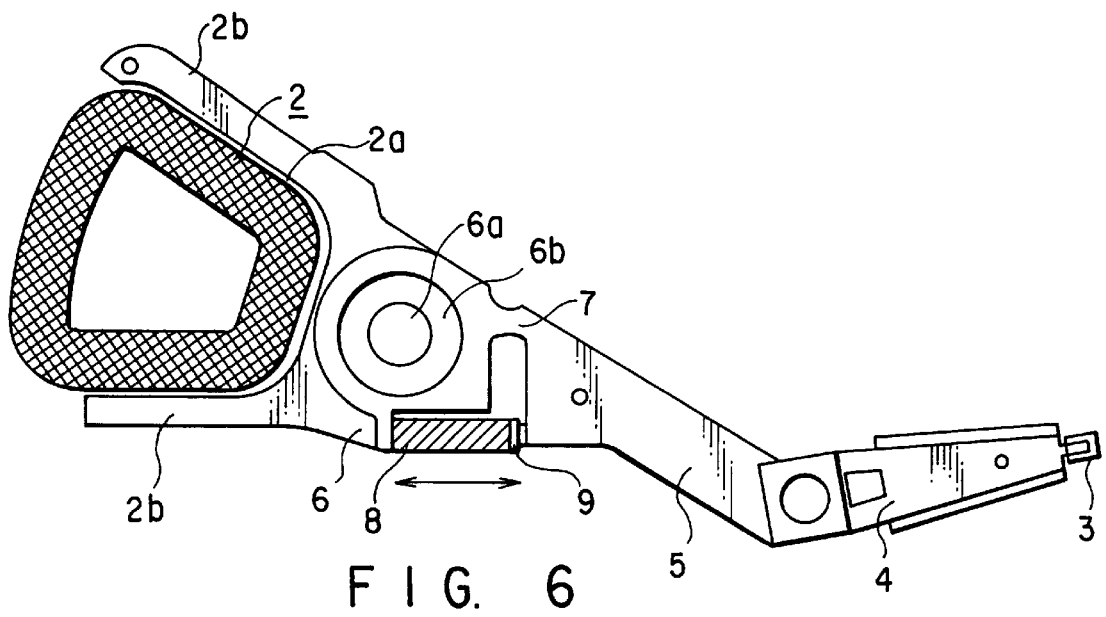
FIG. 6 is a top view showing main sections of a head driving device of a first embodiment.
Figure 8:
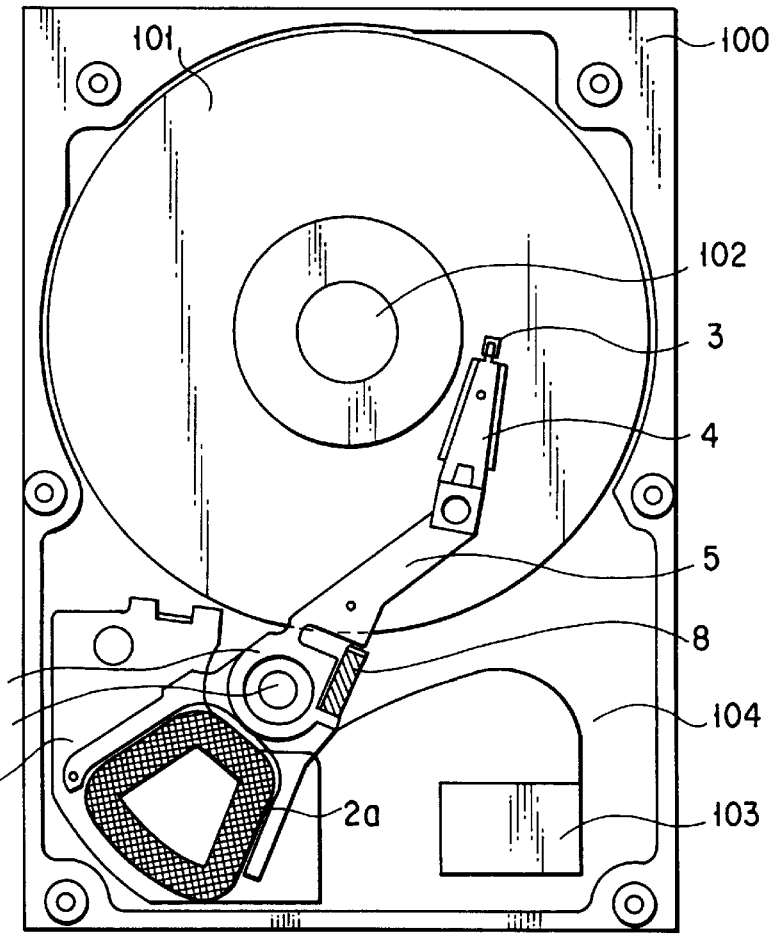
FIG. 8 is a top view showing main sections of a HDD of the first embodiment.

FIG. 6 is a top view illustrating the main sections of a head driving device of a first embodiment, FIG. 7 a side view illustrating the same and FIG. 8 a top view illustrating the main sections of a HDD of the first embodiment.

[HDD Structure]

The head driving device of the first embodiment is a rotary and oscillatory type mechanism having a piezoelectric element 8 functioning as an sub-actuator (sub-actuator).

Figure 1:
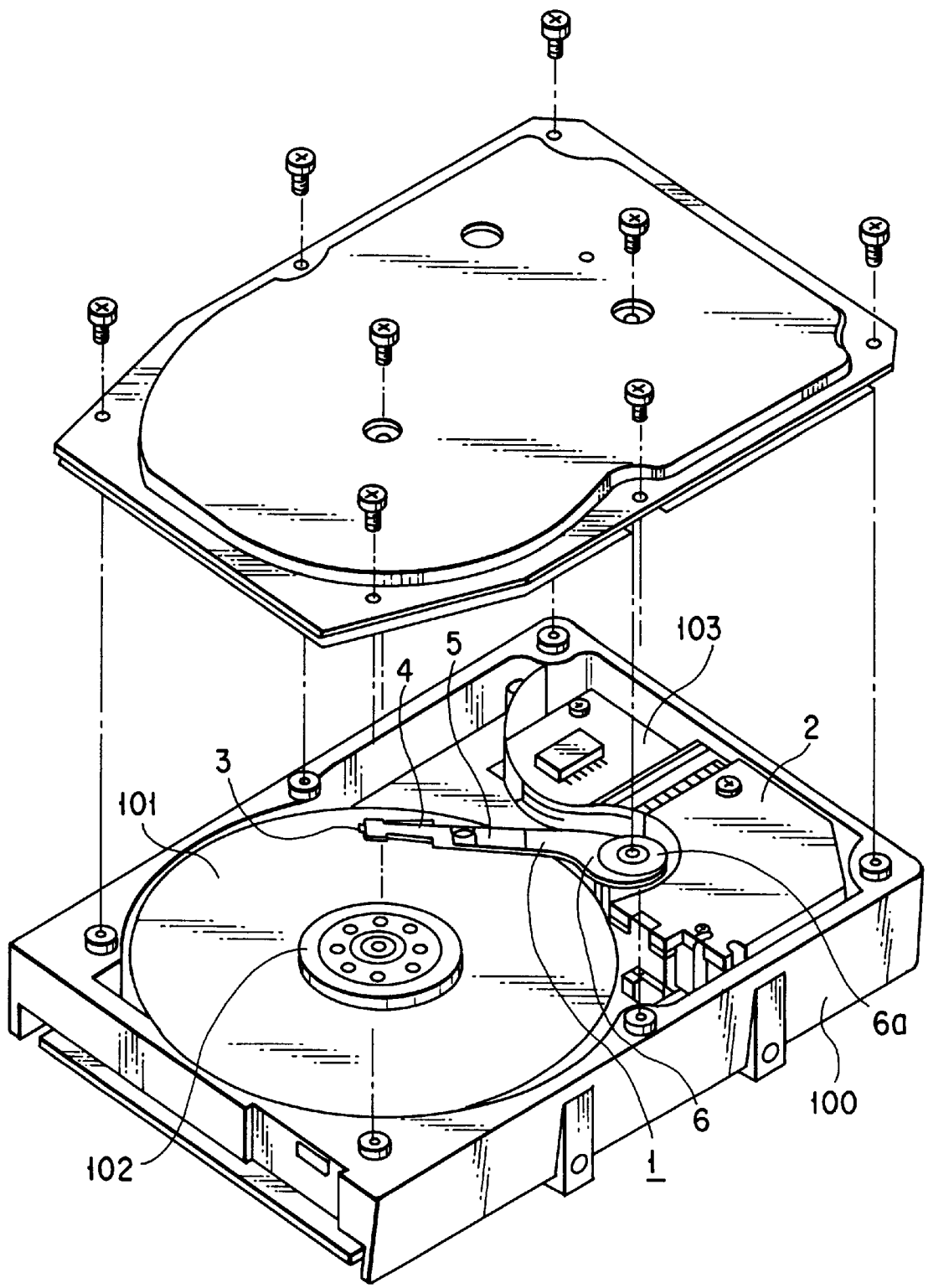
FIG. 1 is a perspective view showing main sections of a conventional HDD.
Figure 2A:
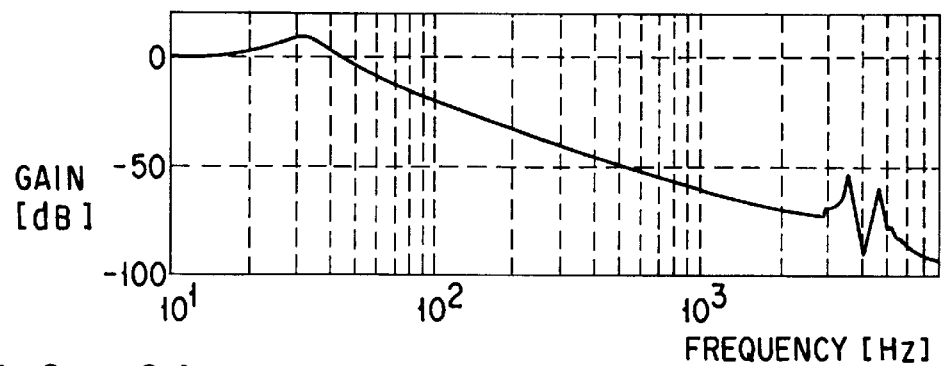
FIGS. 2A and 2B are views of transmission characteristics of a conventional actuator mechanism.
Figure 2B:
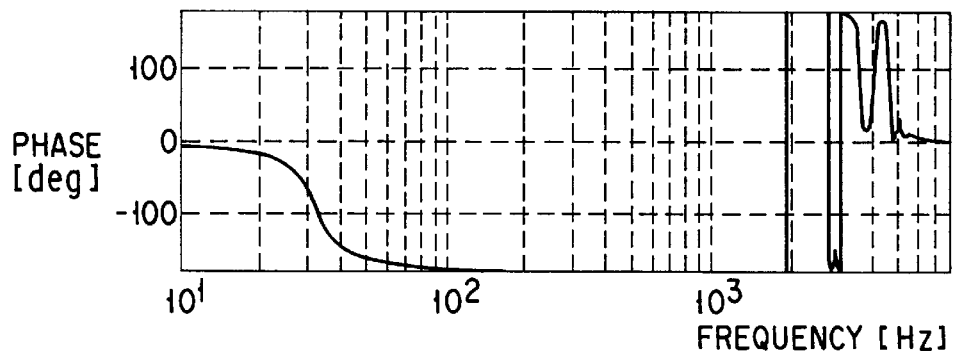

The compact HDD of the embodiment incorporates, in a case 100 made of, for instance an aluminum alloy, the head driving device of the embodiment, a disk 101, a spindle motor 102, a VCM 2, a circuit substrate 103 and a flexible print circuit (FPC) 104. Components other than the head actuator, later described, of the embodiment are similar to those of the conventional HDD (see FIGS. 2A and 2B). The case 100 is covered by a cover, not shown, to be hermetically sealed.

The disk 101 is rotated at a constant and high speed by the spindle motor 102. The circuit substrate 103 are provided with various circuit parts mounted thereon, for instance a head amplifier for amplifying a read signal from a head 3. The FPC 104 is composed of a signal line for connecting the head 3 with the head amplifier and a wiring pattern of a cable, etc., for driving the VCM 2 and the piezoelectric element 8 of the head driving device.

Normally, a plurality of disks 101 are provided. A plurality of heads 3 are disposed oppositely to both surfaces of each disk 101.

The head driving device is drive-controlled by a servo system (servo circuit and CPU are main components), not shown, and rotary-driven in the radial direction of the disk 101. In this manner, the head 3 mounted on a slider moves in the radial direction of the disk 101 being in a flying state. The servo system executes head positioning control (servo system) including speed control and position control and positions the head 3 in a target position (lastly, in the track center) on the disk 101.

[Head Driving Apparatus Structure]

The head driving device comprises, as shown in FIG. 6, a thin plate suspension 4 supporting the head 3 on its tip, a support arm 5 supporting the suspension 4 on its tip for transmitting a rotational driving force and an actuator body 6 supporting the support arm 5 and rotary-driven around a rotary shaft 6a by means of the driving force of the VCM 2.

The actuator body 6 is provided with ball bearings 6b in two spots, upper and lower, around the rotary shaft 6a so as to be freely rotated and oscillated in the radial direction of the disk 101.

The head driving device of the embodiment is provided with the VCM 2 as main driving means and the piezoelectric element 8 as sub-driving means.

The VCM 2 is composed of a driving coil 2a provided in a coil frame 2b having an almost V-shaped structure, a permanent magnet, not shown and opposing yokes. The permanent magnet and the opposing yokes constituting a magnetic circuit are disposed in upper and lower directions so as to sandwich the driving coil 2a held on the coil frame 2b.

The piezoelectric element 8 is, as shown in FIG. 6, provided in the actuator body 6 not interfering with the outer diameter of the disk 101. As shown in FIG. 7, at least one piezoelectric element 8 must be provided and the number thereof must be smaller than that of support arms 5 at the most. The piezoelectric element 8 is placed in the vicinity of the centrobaric position 10 of the actuator mechanism in upper and lower directions.

The piezoelectric element 8 expands/contracts, as shown in FIG. 6, in a longitudinal direction (arrow direction) according to supplying of a driving voltage and produces driving forces for rotary-driving all the support arms in a fine manner via an installation material 9. In order to realize this fine driving, in the embodiment, a hinge 7 is provided for finely rotary-driving the support arms 5 against the actuator body 6.

[Function and Effect of the First Embodiment]

The HDD servo system rotates and oscillates the actuator body 6 around the rotary shaft 6a by supplying a driving current to the driving coil 2a of the VCM 2 and by means of an electromagnetic force produced in the driving coil 2a.

Specifically, the actuator body 6 is rotary-driven by the VCM 2 as the main actuator and the support arms 5 are integrally (simultaneously) driven in the radial direction of the disk 101. Thus, each head 3 is moved in the radial direction of the disk 101 and positioned in a target position. This is how the main actuator operates.

Then, the servo system supplies a driving voltage to the piezoelectric element 8 as the sub-actuator. The piezoelectric element 8 expands/contracts by several $\mu$m in a longitudinal direction according to the supplied driving voltage and produces a tensile force or a compressing force.

Therefore, as shown in FIG. 6, a moment force is produced in the hinge 7 of the actuator body 6 and the support arms 5 are finely rotary-moved simultaneously (together). Thus, each head 3 normally moves by a small distance equivalent to several tracks and tiny position adjustment is performed.

By the sub-actuator using such function of the piezoelectric element 8, it is possible to perform fine movement adjustment for each head 3. Being disposed in the vicinity of the centrobaric position 10 of the upper and lower directions of the actuator mechanism, as noted above, the piezoelectric element 8 has a structure of providing almost no excitement to the vibration mode in the upper and lower directions of the each support 5.

Also, since at least one piezoelectric element 8 is disposed in the vicinity of the centrobaric position 10 in a concentrated manner, the support arms 5 can be integrally driven, making uniform movement characteristics among these.

Furthermore, since the number of piezoelectric elements 8 is smaller than that of support arms 5, the numbers of cables and driving circuits for supplying driving voltages to the piezoelectric elements 8 may be reduced to the necessary minimum. In other words, compared with the conventional method of providing a piezoelectric element corresponding to each support arm 5, it is possible to greatly reduce the number of piezoelectric elements 8.

[First Modification of the First Embodiment]

FIG. 9 illustrates the structure of the installation material 90 of the piezoelectric element 8. This installation material 90 is structured in a manner that a thickness TH1 near the bonded surface between the support arm 5 and the piezoelectric element 8 is set larger than a thickness TH2 in the other portions. With this structure, when the expanding/contracting force of the piezoelectric element 8 is applied, stress applied to the support arms 5 will be reduced and driving forces applied thereto will be made uniform.

[Second Modification of the First Embodiment]

FIG. 10 illustrates the case where a plurality of support arms 91 integral with a head suspension are attached to the actuator body. In the actuator body 6, the plurality of head suspension integral type support arms 91 are sandwiched between a plurality of spacer blocks 92 disposed therebetween and similarly sandwiched between a plurality of installation materials 9 coupled with the piezoelectric elements 8. The head suspension integral type support arms 91 and the spacer blocks 92 and the head suspension integral type support arms 91 and the installation materials 9 are fixed together by means of adhesives, screws or caulking. Thus, even when gaps among the disks are made narrow or a disk stack is increased, it is possible to simultaneously drive the support arms by the sub-actuator.

[Second Embodiment]

Figure 11:
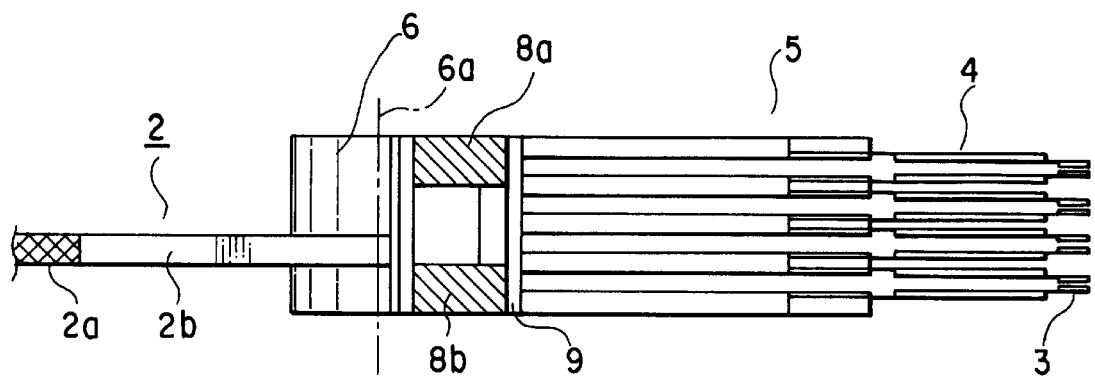
FIG. 11 is a side view showing main sections of a head driving device of a second embodiment.

FIG. 11 is a side view illustrating a head driving device of a second embodiment.

In the second embodiment, the device is structured in a manner that two piezoelectric elements 8a and 8b constituting an sub-actuator are disposed away by the same distance from a centrobaric position in the upper and lower directions of a mechanism. The other structural portions are the same as those of the first embodiment.

Thus, the functions and effects of the second embodiment are similar to those of the first embodiment discussed above. Specifically, it is possible to integrally drive support arms 5 by means of function of the expanding/contracting forces of the piezoelectric elements 8a and 8b. Moreover, by placing the piezoelectric elements 8a and 8b in positions for making uniform driving characteristics among the support arms 5, it is possible to improve uniformity among the movement characteristics of the support arms 5.

[Third Embodiment]

Figure 12:
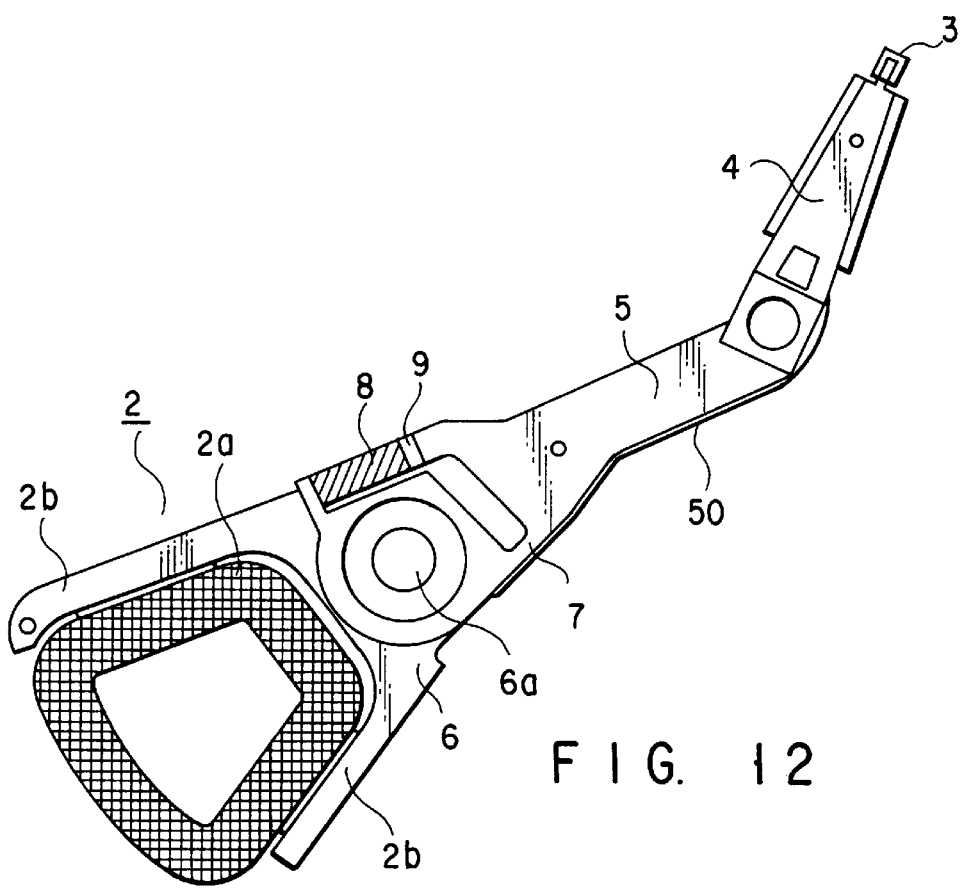
FIG. 12 is a top view showing main sections of a head driving device of a third embodiment.

FIG. 12 is a top view illustrating the main sections of a head driving device of a third embodiment.

In the third embodiment, the device is structured in a manner that a piezoelectric element 8 as part of an sub-actuator is disposed in a direction opposite a line connecting together the rotary center 6a and the head 3 of an actuator body 6. The other structural portions and functions and effects of driving of the sub-actuator are the same as those of the first embodiment.

In recent years, as a technology for attaining a high recording density for the HDD, attention has been focused on a recording/reproducing separation type head, wherein a head 3 is formed by combining a reproduction only MR (magnetoresistive) head and a guiding type thin film head for recording.

The MR head is a main element for attaining a high recording density, since this has an excellent special quality of being capable of obtaining a high output without depending on the circumferential speed of a disk.

However, when a signal line for transmitting a read signal from the MR head, due to a low-pass filter characteristic because of the increase of external electric noises or the increase of inductance, quality deterioration may occur in the read signal used in a high frequency band of MHz or over. For this reason, it is desired to make short a read signal line 50 connected to the MR head and provide a FPC 104 close to the head amplifier on the circuit substrate 103.

Thus, according to the embodiment, it is possible, by placing the piezoelectric element 8 in the side opposite the attaching side of the FPC 104, to make short a distance between the piezoelectric element 8 and the head amplifier and reduce electric noises produced by the piezoelectric element 8 in the read signal.

[Fourth Embodiment]

The fourth embodiment relates to a driving control method for the main actuator and the sub-actuator in the head driving device of the first embodiment.

FIG. 13 is a block diagram showing a feedback control system included in the driving control system of the embodiment. The input signal E of the control system is a position error signal indicating the positioning error of the head 3 to the target position. This position error signal is produced based on servo data (cylinder number for speed control and burst data for position control) recorded beforehand in the servo area of the disk.

This position error signal E is input to the driving section (represented as a transmission characteristic P1(S)) 32 of the main actuator via a compensator 31. The driving section 32 of the main actuator is driven based on the input position error signal E.

In the meantime, the phase of the position error signal E is reversed by an invertible amplifier 35, provided with a given gain K by a gain section (K) 33 and input to the driving section (represented as a transmission characteristic P2(S)) 34 of the sub-actuator. At this time, the invertible amplifier 35 reverses the phase in a low frequency band of 100 Hz to 1 kHz.

On the basis of the added result of outputs from the main and sub-actuators 32 and 34, the head 3 is controlled to move to the target position. That is, the head 3 is positioned so as to move in the radial direction of the disk and not to shift away from a track as the target position.

By employing the driving control method with such a feedback loop formed, it is possible to cancel the mechanical main resonance vibration mode of the whole head driving device and highly accurately position the head 3 in the target position.

Figure 4:
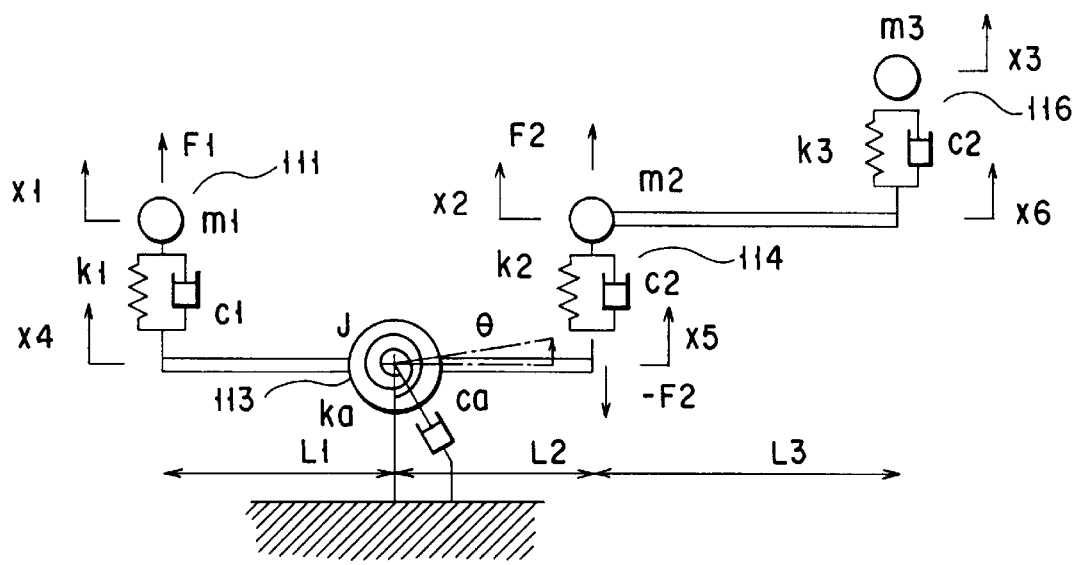
FIG. 4 is a view of a concept of representing the conventional actuator mechanism as a vibration model.
Figure 3A:
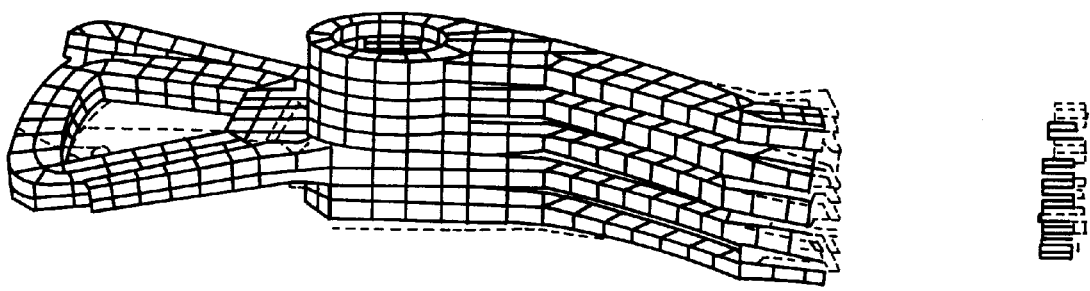
FIGS. 3A to 3C are views of mechanical resonance modes in the conventional actuator mechanism.
Figure 3A:
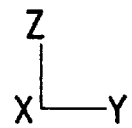
Figure 3B:
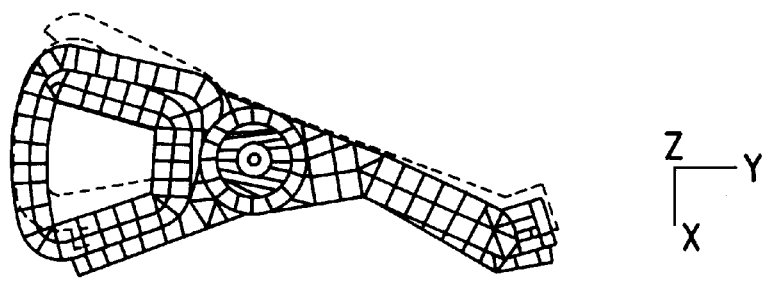
Figure 3B:
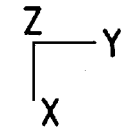
Figure 3C:
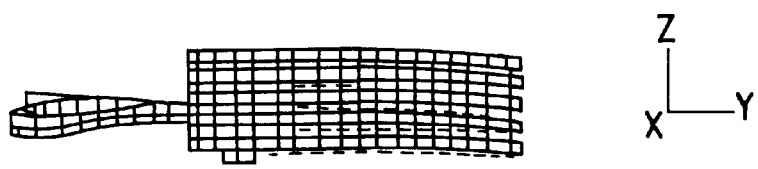
Figure 3C:
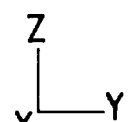
Figure 5A:
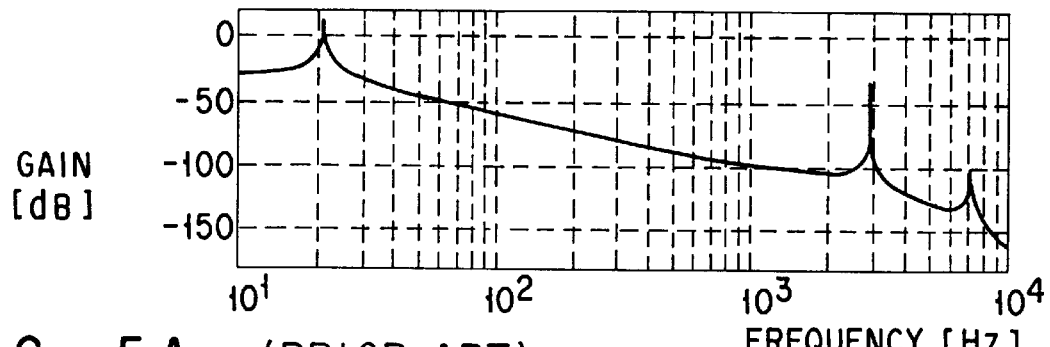
FIGS. 5A to 5D are views of transmission characteristics in the conventional actuator mechanism.
Figure 5B:
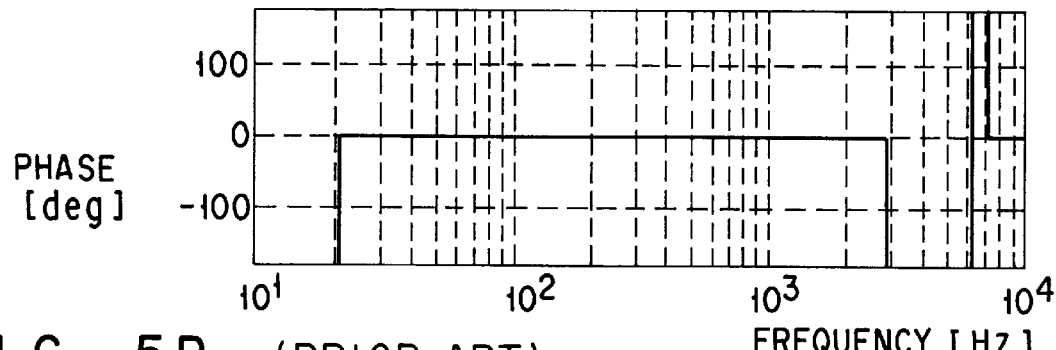
Figure 5C:
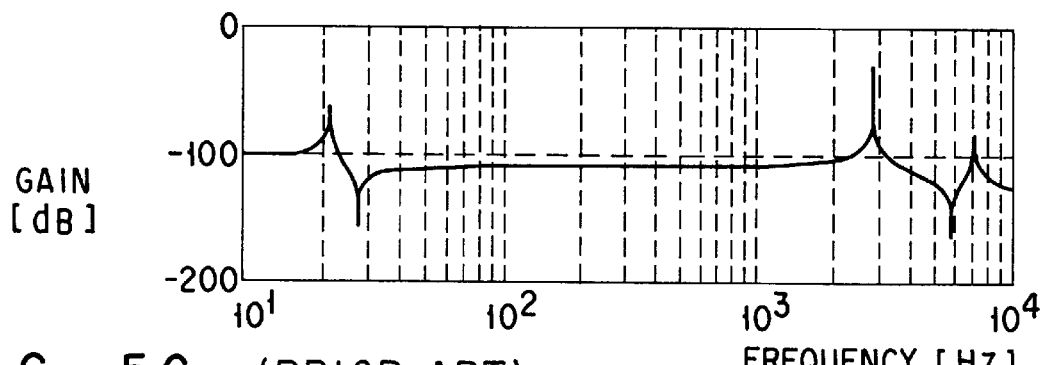
Figure 5D:
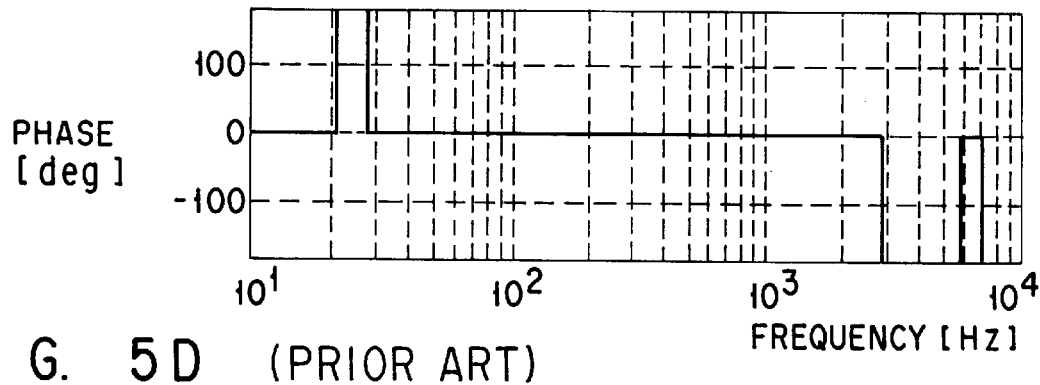

Next, the operation principle of the control system of the embodiment will be described by referring to the simple model (FIG. 4) and the expressions (3) and (4).

On the basis of FIGS. 5A to 5D and the expressions (3) and (4), the transmission characteristic P1(S) of head displacement by the main actuator and the transmission characteristic P2(S) of head displacement by the sub-actuator are modified to quadratic delay forms as follows:

$$P1(S) = K1\frac{1}{S^2} + \frac{A1}{(S^2 + 2\zeta\omega_0 S + \omega_0^2)} \tag{5}$$

$$P2(S) = K2\frac{A1}{(S^2 + 2\zeta\omega_0 S + \omega_0^2)} \tag{6}$$

Herein, $\omega_0$ indicates an angular frequency (rad/sec) in the mechanical main resonance mode of the whole actuator mechanism and $\zeta$ modal damping constant. A response gain in the driving section 32 of the main actuator is represented as K1 and a kind of exciting factor in the main resonance mode as A2. The exciting factor means a factor from a force point to an output point.

If it is assumed, like the region surrounded by a dotted line in the block diagram of FIG. 13, that the transmission characteristic P1 of the driving section 32 and the transmission characteristic P2 of the driving section 34 are integrated in one driving section P, the following expressions (7) and (8) hold true:

$$P(S)=P1(S)+KP2(S) \tag{7}$$

$$P1(S) = K1\frac{1}{S^2} + \frac{1}{(S^2 + 2\zeta\omega_0 S + \omega_0^2)}(K1A1 + KK2A2) \tag{8}$$

Herein, by causing a gain due to the mechanical main resonance of the whole actuator mechanism at the angular frequency $\omega_0$ to be 0, no head peaks will be reached on the gain until a high frequency band.

This condition is established by the following:

$$K1A1+KK2A2=0 \tag{9}$$

$$K = -\frac{K1A1}{K2A2} \tag{10}$$

A gain K is calculated by using the expression (10) and a transmission characteristic P(S) is shown in FIGS. 14A and 14B. It should be clearly understood from FIGS. 14A and 14B that different from FIGS. 5A and 5C, there are no sharp peaks around 3 kHz due to the mechanical resonance mode of the whole actuator any more.

Therefore, by obtaining the gain K from the expression (10), it is possible to cancel the mechanical resonance mode of the whole actuator mechanism produced by driving of the main actuator by means of driving of the sub-actuator. An advantage of this driving control method is that frequencies $\omega_0$ and damping $\zeta$ in the mechanical resonance mode are the same between the main actuator and the sub-actuator.

Figure 15A:
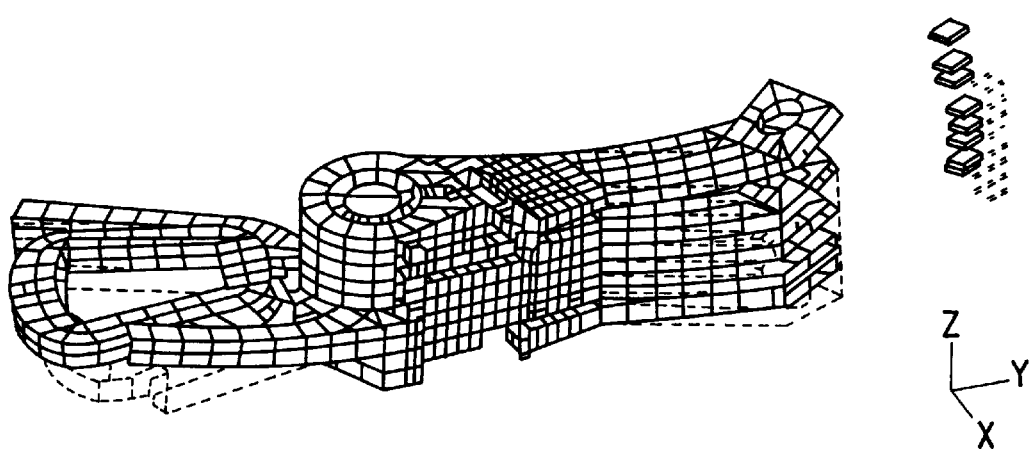
FIGS. 15A to 15C are views of mechanical resonance modes of the fourth embodiment.
Figure 15B:
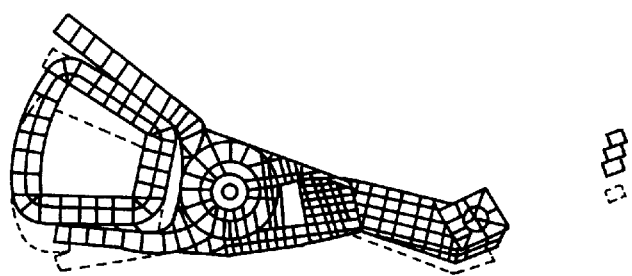
Figure 15C:
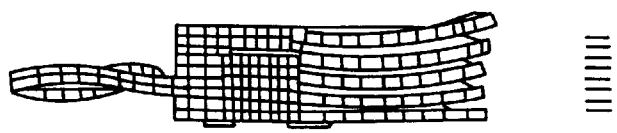

FIGS. 15A to 15C respectively illustrate the mechanical resonance mode of the entire actuator mechanism analyzed by using the characteristic value analyzing routine of a limited element method structure analysis in the head driving device of the first embodiment. In this mode, the driving coil and the coil frame are greatly deformed and in this case, a mechanical resonance frequency is 3.6 kHz.

Figure 16A:
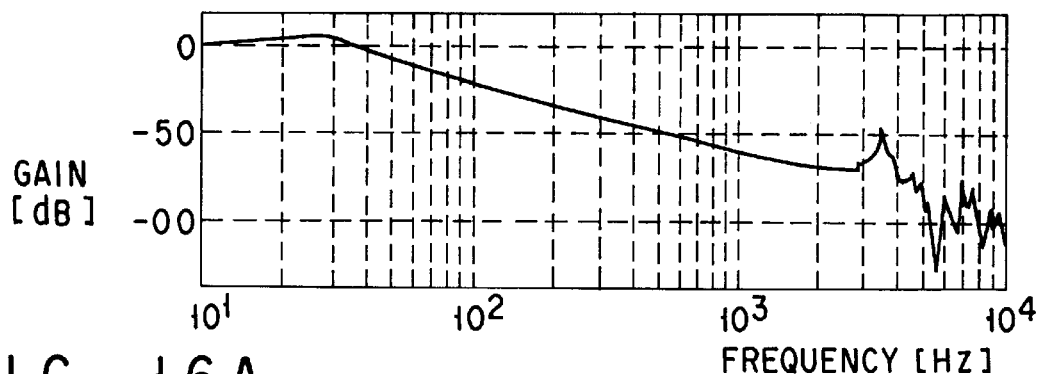
FIGS. 16A to 16D are views of results of analyzing transmission characteristics of an actuator structure of the fourth embodiment.
Figure 16B:
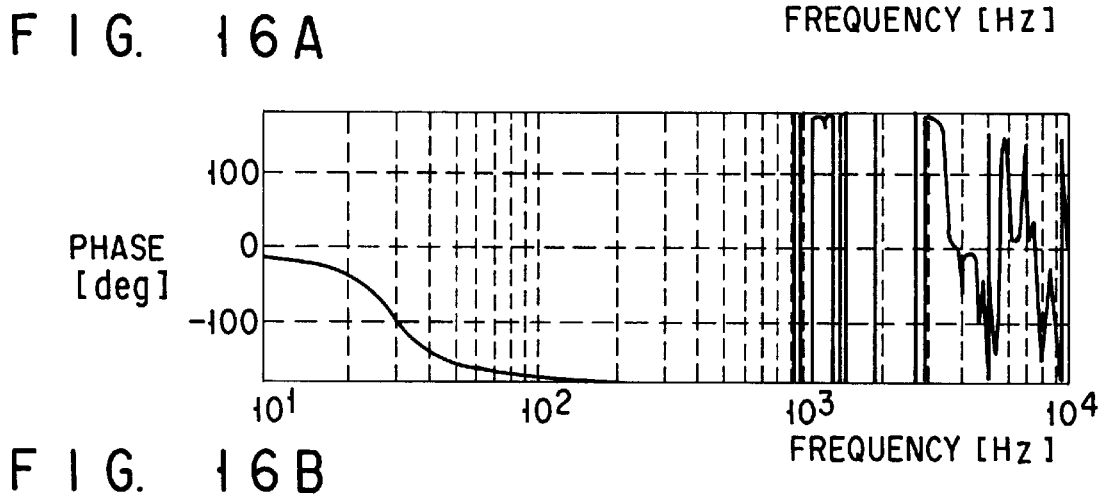
Figure 16C:
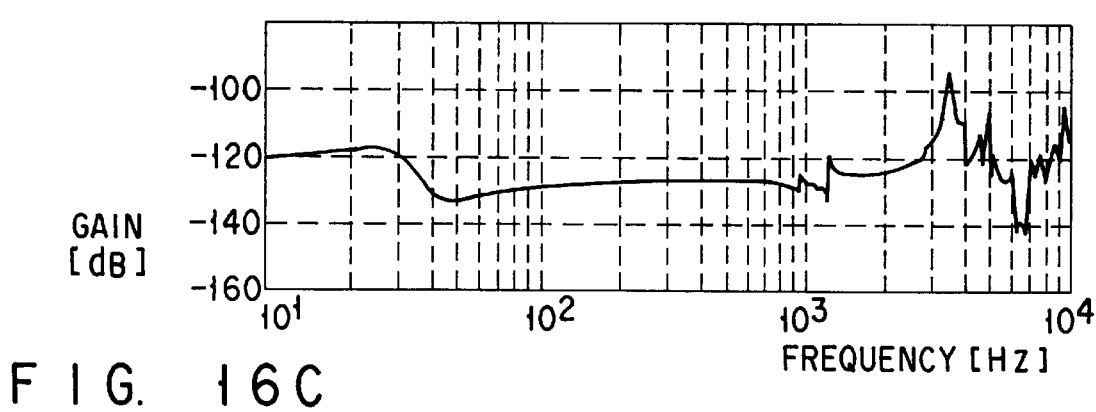
Figure 16D:
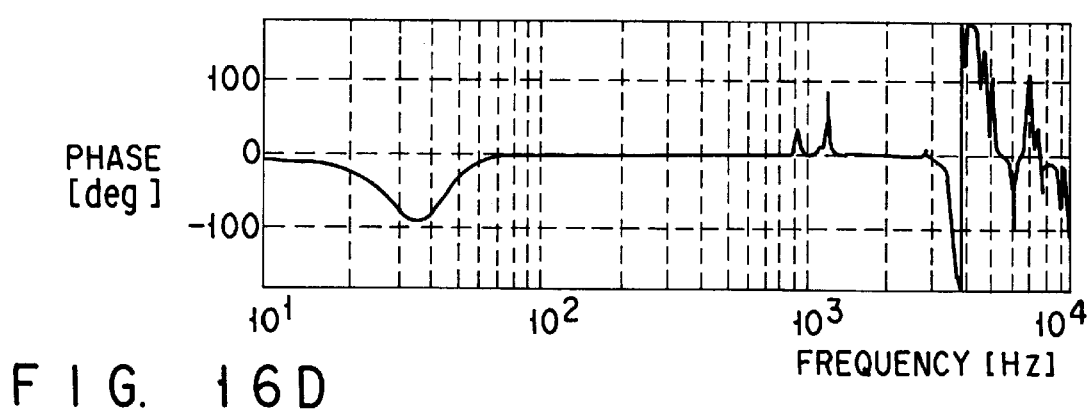

FIGS. 16A and 16B respectively illustrate the result of analyzing the head transmission characteristic P1(S) against the VCM 2 as driving means for the main actuator. FIGS. 16C and 16D illustrate the result of analyzing the head transmission characteristic P2(S) against the piezoelectric element 8 as driving means for the sub-actuator. In the frequency of 3.6 kHz, these have sharp peaks (increase of about 30 dB) due to the vibration mode shown in FIGS. 15A to 15C.

Figure 17A:
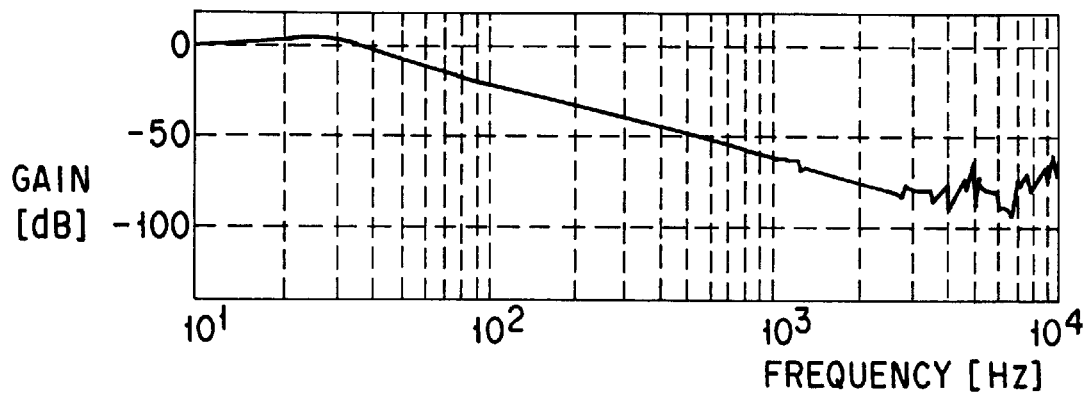
FIGS. 17A to 17B are views showing transmission characteristics of the fourth embodiment.
Figure 17B:
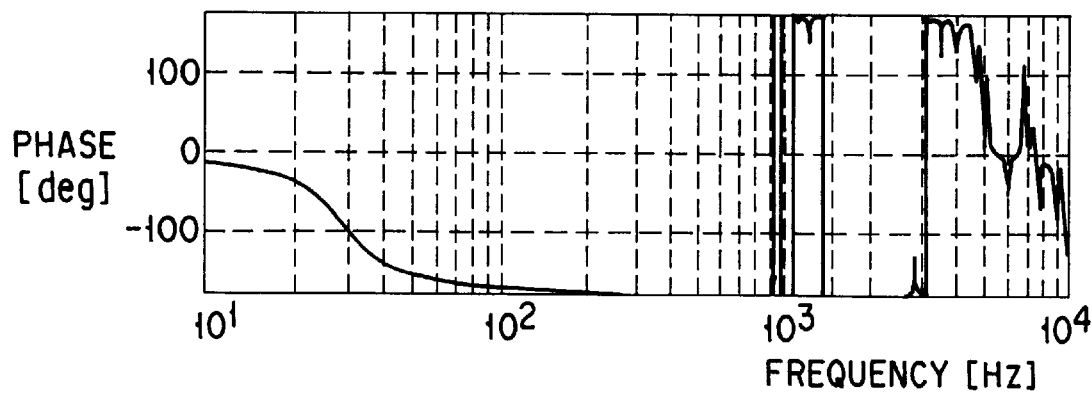

The gain K and the transmission characteristic P(S) in a portion surrounded by a dotted line in FIG. 13 obtained from these results are shown in FIGS. 17A and 17B. It should be understood, by comparing those shown in FIGS. 17A and 17B and 16A and 16B with one another, that the resonance peaks due to the vibration mode of FIGS. 15A to 15C have been eliminated. This transmission characteristic begins to decline from around a low band (about 30 Hz) with almost no big peaks existing up to the vicinity of 5 kHz. If such mechanical transmission characteristic is obtained, a gain cross frequency for the servo system can be increased. That is, the head can follow up the target track on the disk up to a high frequency band. Thus, it is possible to improve head positioning accuracy and make small track pitches on the disk so as to increase the storage capacity.

[Fifth Embodiment]

The fifth embodiment is an example of applying the driving control method of the fourth embodiment to a digital control system using a microprocessor (MPU).

Figure 18:
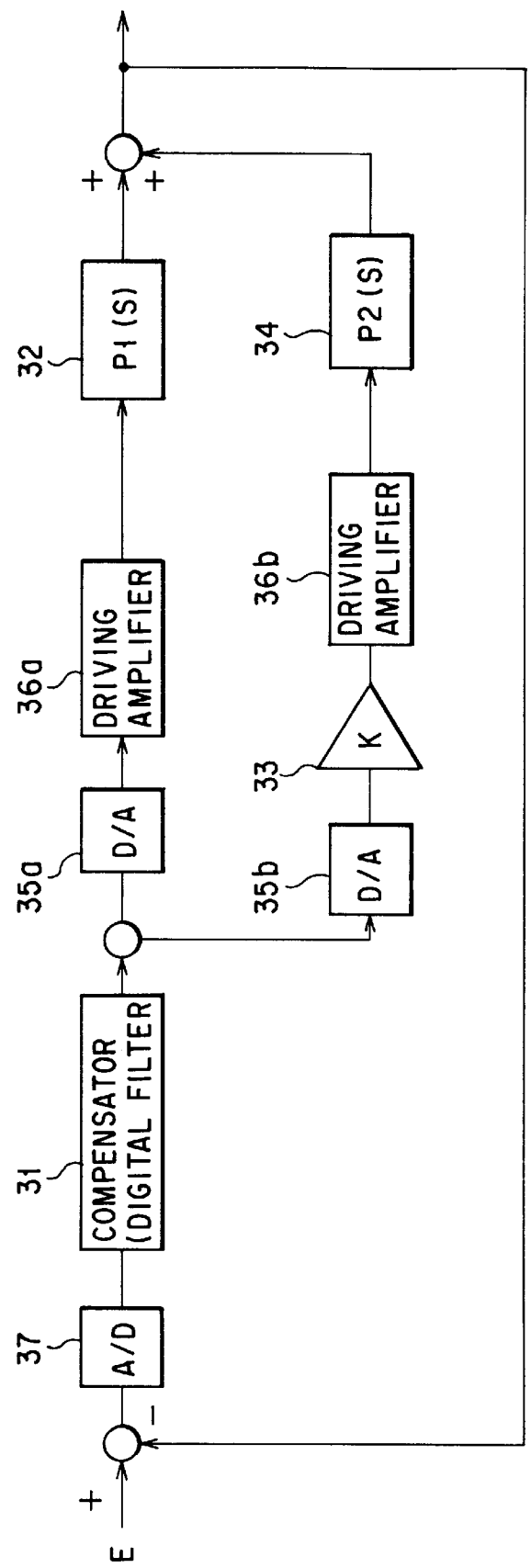
FIG. 18 is a block diagram of a control system of a fifth embodiment.

In the digital control system, as shown in FIG. 18, the position error signal E read by the head is converted into digital data by an A/D converter 37 and input to the MPU.

The MPU incorporates a compensator 31 as a digital filter. The digital filter is equivalent to digital filter arithmetic processing carried out by the MPU.

A digital control output from this compensator 31 is converted into an analog signal by a D/A converter 35a, amplified by a driving amplifier 36a and input to the driving section of the main actuator.

The digital control output is also converted into an analog signal by the D/A converter 35a, provided with a gain K by a gain section 33 and amplified by a driving section 36b. DC components are then cut off from the control output by a high-pass filter, for instance a butterworth filter, not shown. An output from the driving amplifier 36b is input to the driving section 34 of the sub-actuator.

Inside the MPU, the high-pass filter is composed of a digital filter. But this high-pass filter may be externally attached. Such a control system by the MPU makes it possible to reduce the number of externally attached amplifiers and determine an optimal value for a gain K.

[Setting of Gain K]

Figure 19:
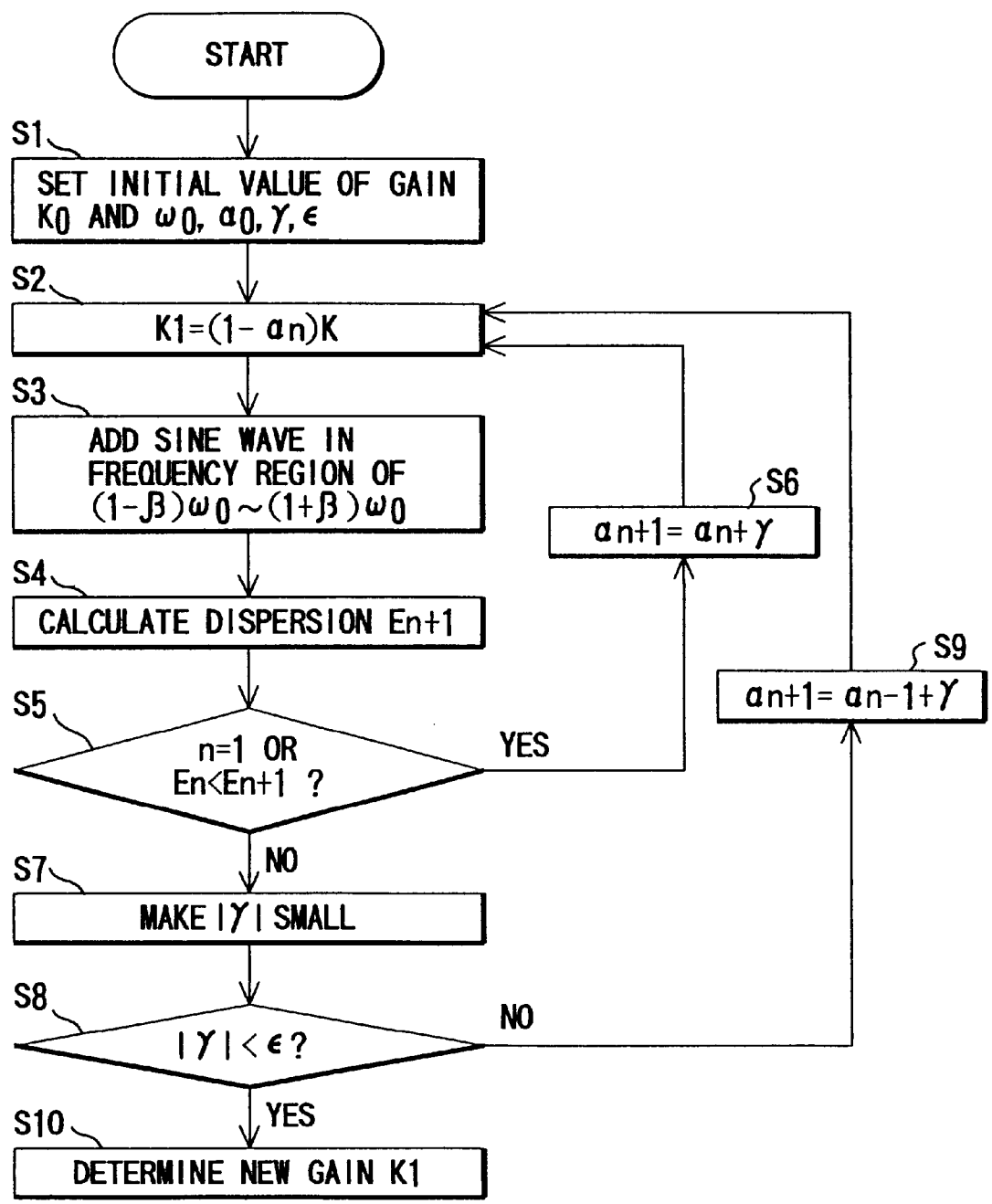
FIG. 19 is a flow chart illustrating a method for setting a gain K of the fifth embodiment.

Setting of the gain K will be described by referring to the flow chart of FIG. 19.

A value for the gain K may be basically obtained by using the expression (10). However, since variance among the devices and shifting with the lapse of time may occur, it is necessary to automatically set the gain K.

A calculating method for determining the gain K by means of internal processing of the MPU will be described hereinbelow.

First, a gain $K_0$ in the expression (8) and a mechanical resonance frequency $\omega_0$ of the actuator mechanism itself are calculated by the structure analysis method, experimental device or the like beforehand. The gain $K_0$, the resonance frequency $\omega_0$ and $\alpha_0$ are set as initial conditions. In this case, $\alpha_n=\alpha_0$ and $\alpha$ is 0.6 to 0.0, where $\alpha_0$ is set to 0.6. Also, the values of $\gamma$ and $\epsilon$ are set (step 1). Where, $\alpha$ and $\gamma$ are positive variables for setting the gain K, and $\epsilon$ is a positive number for judging a convergence.

The gain $K_1$ is calculated by the MPU on the basis of $(1-\alpha_n) \times K_0$ (step S2).

A sine wave signal with constant amplitude is input to a input stage of the compensator of the MPU for a cut width of about $\omega_0/400$ from $(1-\beta) \times \omega_0$ to $(1+\beta) \times \omega_0$ (step S3). Where, the cut width of the frequency is changed in one period or larger. The $\beta$ is set to about 0.1 to 0.3.

With this condition, a dispersion $E_n$ of the position error signal from the head is calculated by the MPU and is stored in the memory (step S4).

Then, set $\alpha_{n+1}=\alpha_n+\gamma$ (in this case, $\gamma=0.1$), and the dispersion $E_{n+1}$ in the same frequency range using $\alpha_{n+1}$ (step S6).

By comparing $E_n$ with $E_{n+1}$, and repeat steps S6, S2, S3, S4 and S5 until the $E_n$ is smaller than the $E_{n+1}$. If n>1 and $E_{n+1}>E_n$, an absolute value of $\gamma$ ($|\gamma|$) is set to the half value (step S7).

If the absolute value is larger than a zero-convergence judging factor ϵ, a value of a new γ is set to the half value of the absolute value of the γ used in the previous calculation (step S8). The value of the new γ is added to the value $α_{n-1}$ which is a value before one step, then a new $α_{n+1}$ is obtained (step 9), thereafter return step S3.

Thus, by executing a repetition calculation to minimize the dispersion of the position error signal, an optimal gain K1 can be calculated (steps S2 to S8, S10).

This method makes it possible to absorb variance in gains K due to variance among the devices and position the head with high accuracy.

The first to third embodiments relate to the structure of the head driving device of the invention while the fourth to sixth embodiments relate to the driving control method of the same. By using these head driving device and driving control method in combination, effects will be multiplied.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A head driving device of a disk recording/reproducing device, which has a plurality of heads mounted thereon to record/reproduce data in and from a disk for positioning the plurality of heads in target positions by moving these in a radial direction of the disk, comprising:

a plurality of suspension members for respectively supporting said plurality of heads;

a head arm member having a plurality of support arms for supporting said plurality of suspension members;

main driving means for moving said plurality of heads by rotary-driving said head arm member;

sub-driving means for integrally driving said plurality of support arms, a number of said sub-driving means is less than a number of said plurality of support arms; and control means for controlling driving of said main and said sub-driving means, adjusting a response vain for each input and canceling a resonance mode vibrating in a radial direction of a disk, said resonance mode caused by deformation of said head arm member.

2. A head driving device according to claim 1, wherein said sub-driving means is disposed almost in a centrobaric position of said head driving device.

3. A head driving device according to claim 1, wherein said control means includes means for controlling driving of said main and sub-driving means based on respective position error signals of said plurality of heads and inputting said position error signals to said main and sub-driving means with phases of these signals reversed among one another in a given low frequency region.

4. A head driving device according to claim 1, wherein said sub-driving means includes at least one piezoelectric element.

5. A head driving device according to claim 1, further comprising a hinge for causing said head arm member to finely rotate by means of a fine driving force provided by said sub-driving means.

6. A head driving device according to claim 5, wherein said sub-driving means is disposed almost in a centrobaric position of said head driving device.

7. A head driving device according to claim 1, wherein said control means includes means for controlling driving of said main and sub-driving means based on respective position error signals of said plurality of heads and inputting said position error signals to said main and sub-driving means with phases of these signals reversed among one another in a given low frequency region.

8. A head driving device according to claim 5, wherein said sub-driving means includes at least one piezoelectric element.

9. A head driving device comprising:

a plurality of suspension members for respectively supporting a plurality of heads;

a head arm member having a plurality of support arms for supporting said plurality of suspension members;

main driving means for moving said plurality of heads by rotary-driving said head arm member;

sub-driving means for fine-driving each of said support arms and fine-adjusting movement of each head moved by said main driving means; and control means for controlling driving of said main and sub-driving means, adjusting a response gain for each input and canceling a resonance mode vibrating in a radial direction of a disk, said resonance mode caused by deformation of said head arm member.

10. A head driving device according to claim 9, wherein said control means includes means for controlling driving of said main and sub-driving means based on respective position error signals of said plurality of heads and inputting said position error signals to said main and sub-driving means with phases of these signals reversed among one another in a given low frequency region.

11. A head driving method in a head driving device of a disk recording/reproducing device, which has a plurality of heads mounted thereon to record/reproduce date in and from a disk for positioning the plurality of heads in target positions by moving these in a radial direction of the disk, a plurality of suspension members for respectively supporting said plurality of heads, a head arm member having a plurality of support arms for supporting said plurality of suspension members for transmitting rotary driving forces for moving the plurality of heads, main driving means for moving said plurality of heads by rotary-driving said head arm member, sub-driving means for integrally driving said plurality of support arms in a fine manner and fine-adjusting movements of the plurality of heads moved by the main driving member, a hinge for causing said head arm member to finely rotate by means of a fine driving force provided by said sub-driving means, a control means for controlling driving of said main and said sub-driving means, adjusting a response gain for each input and canceling a resonance mode vibrating in said radial direction of said disk, said control means including means for controlling driving of said main and sub-driving means based on respective position error signals of said plurality of heads and inputting said position error signals to said main and sub-driving means with phases of these signals reversed among one another in a given low frequency region, wherein said means for controlling performs the steps comprising:

a first step for setting an initial value:

a second step for inputting a specified sine wave signal to said sub-driving means and obtaining the position error signals indicating position errors of the head relative to a target position;

a third step for controlling driving of said main and sub-driving means based on respective position error signals of said plurality of heads:

a fourth step of obtaining a dispersion value of the position error signals obtained in said second step upon performing of said third step; and a fifth step for repeating processing from said second step to said fourth step until the calculated dispersion value ceases to decrease such that said position error signals reaches a prescribed value or lower.

12. A head driving method in a head driving device of a disk recording/reproducing device, which has a plurality of heads mounted thereon to record/reproduce date in and from a disk for positioning the plurality of heads in target positions by moving these in a radial direction of the disk, a plurality of suspension members for respectively supporting said plurality of heads, a head arm member having a plurality of support arms for supporting said plurality of suspension members for transmitting rotary driving forces for moving the plurality of heads, main driving means for moving said plurality of heads by rotary-driving said head arm member, sub-driving means for integrally driving said plurality of support arms in a fine manner and fine-adjusting movements of the plurality of heads moved by the main driving member, a hinge for causing said head arm member to finely rotate by means of a fine driving force provided by said sub-driving means, a control means for controlling driving of said main and said sub-driving means, adjusting a response gain for each input and canceling a resonance mode vibrating in said radial direction of said disk, said control means including means for controlling driving of said main and sub-driving means based on respective position error signals of said plurality of heads and inputting said position error signals to said main and sub-driving means with phases of these signals reversed among one another in a given low frequency region, wherein said means for controlling performs the steps comprising:

a first step for setting an initial value;

a second step for inputting a specified sine wave signal to said sub-driving means and obtaining the position error signals indicating position errors of the head relative to a target position;

a third step for controlling driving of said main and sub-driving means based on respective position error signals of said plurality of heads;

a fourth step of obtaining a dispersion value of the position error signals obtained in said second step upon performing of said third step; and a fifth step for repeating processing from said second step to said fourth step until the calculated dispersion value ceases to decrease such that said position error signal reaches a prescribed value or lower.

13. A head driving method in a head driving device including a plurality of suspension members for respectively supporting a plurality of heads, a head arm members having a plurality of support arms for supporting said plurality of suspension members for transmitting rotary-driving forces for moving the plurality of heads, main driving means for moving said plurality of heads by rotary-driving said head arm member, sub-driving means for fine-driving each of said plurality of support arms and fine-adjusting movement of each head moved by the main driving means, control means for controlling driving of said main and said sub-driving means, adjusting a response gain from each input and canceling a resonance mode vibrating in a radial director of said disk, wherein said control means performs the steps comprising:

a first step for setting an initial value;

a second step for inputting a specified sine wave signal to said sub-driving means and obtaining the position error signals indicating position errors of the head relative to a target position;

a third step for controlling driving of said main and sub-driving means based on respective position error signals of said plurality of heads;

a fourth step of obtaining a dispersion value of the position error signals obtained in said second step upon performing of said third step; and a fifth step for repeating processing from said second step to said fourth step until the calculated dispersion value ceases to decrease such that said position error signal reaches a prescribed value or lower.

14. A head driving method in a head driving device including a plurality of suspension members for respectively supporting a plurality of heads, a head arm member having a plurality of support arms for supporting said plurality of suspension members for transmitting rotary-driving forces for moving the plurality of heads, main driving means for moving said plurality of heads by rotary-driving said head arm member, sub-driving means for fine-driving each of said plurality of support arms and fine-adjusting movement of each head moved by the main driving means, control means for controlling driving of said main and said sub-driving means, adjusting a response gain from each input and canceling a resonance mode vibrating in a radial direction of said disk, said control means including means for controlling driving of said main and sub-driving means based on respective position error signals of said plurality of heads and inputting said position error signals to said main and sub-driving means with phases of these signals reversed among one another in a given low frequency region, wherein said control means performs the steps comprising:

a first step for setting an initial value;

a second step for inputting a specified sine wave signal to said sub-driving means and obtaining the position error signals indicating position errors of the head relative to a target position;

a third step for controlling driving of said main and sub-driving means based on respective position error signals of said plurality of heads;

a fourth step of obtaining a dispersion value of the position error signals obtained in said second step upon performing of said third step; and a fifth step for repeating processing from said second step to said fourth step until the calculated dispersion value ceases to decrease such that said position error signals reaches a prescribed value or lower.

* * * * *